(12) United States Patent
Mohan et al.

(10) Patent No.: US 9,542,514 B2
(45) Date of Patent: Jan. 10, 2017

(54) CONSTRAINT MEMORY NODE IDENTIFICATION IN SEQUENTIAL LOGIC

(71) Applicant: Synopsys, Inc., Mountain View, CA (US)

(72) Inventors: Srivathsan Krishna Mohan, Mountain View, CA (US); Qing Zhang, Sunnyvale, CA (US); Paul Frain, Dublin (IE)

(73) Assignee: Synopsys, Inc., Mountain View, CA (US)

( * ) Notice: Subject to any disclaimer, the term of this patent is extended or adjusted under 35 U.S.C. 154(b) by 833 days.

(21) Appl. No.: 13/914,476

(22) Filed: Jun. 10, 2013

(65) Prior Publication Data

US 2014/0365197 A1    Dec. 11, 2014

(51) Int. Cl.
*G06F 17/50*    (2006.01)

(52) U.S. Cl.
CPC ....... *G06F 17/5031* (2013.01); *G06F 17/5022* (2013.01); *G06F 17/5045* (2013.01); *G06F 2217/84* (2013.01)

(58) Field of Classification Search
CPC ............. G06F 17/5031; G06F 17/5022; G06F 2217/84; G06F 17/5045; G06F 17/5027
USPC ...................................................... 703/14, 13
See application file for complete search history.

(56) References Cited

U.S. PATENT DOCUMENTS

| 4,142,493 A * | 3/1979 | Schira ................ F02D 41/0077 123/486 |
| 6,237,117 B1 * | 5/2001 | Krishnamoorthy ....................... G01R 31/31834 714/718 |
| 2010/0077366 A1 * | 3/2010 | Bjesse ................ G06F 17/5022 716/106 |
| 2011/0307233 A1 * | 12/2011 | Tseng et al. ........ G06F 17/5022 703/14 |

OTHER PUBLICATIONS

Krishnaswamy, Smita et al., "Signature-Based SER Analysis and Design of Logic Circuits", Jan. 2009, IEEE Transactions on Computer-Aided Design of Integrated Circuits and Systems, vol. 28, No. 1., IEEE.*
Monteiro, Jose et al., "Retiming Sequential Circuits for Low Power", Jun. 1996, International Journal of High Speed Electronics and Systems, 7 (02).*

* cited by examiner

*Primary Examiner* — Cedric D Johnson
(74) *Attorney, Agent, or Firm* — Bever, Hoffman & Harms, LLP

(57) ABSTRACT

A method of identifying memory nodes includes reading a netlist of the design. For a sequential cell of the design, constraint arcs between constraint and related pins can be extracted. For each constraint arc, an original vector set including initialization waveforms can be generated. A plurality of simulations can be run using a plurality of vector sets to generate a plurality of node sets. Each simulation generates a corresponding node set that toggles based on waveforms provided by a corresponding vector set. Each vector set is derived from the original vector set. A final set (Continued)

of memory nodes for the sequential circuit cell can be calculated by subtracting one node set from another node set. In one embodiment, the method can further include pruning non-gate connected nodes from the final node set.

8 Claims, 14 Drawing Sheets

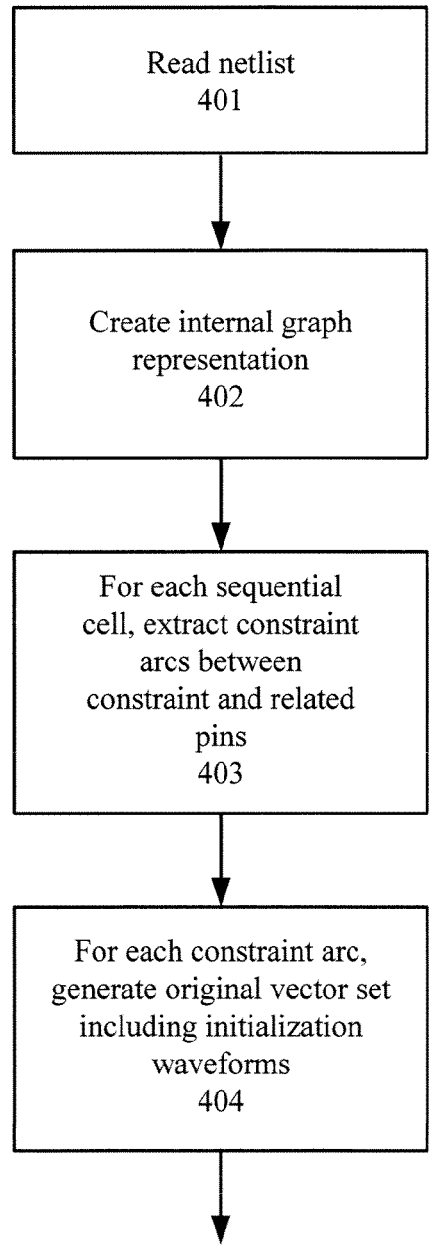
Figure 4A
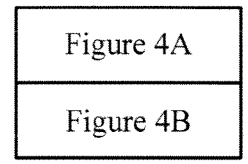

CONSTRAINT MEMORY NODE IDENTIFICATION IN SEQUENTIAL LOGIC

RELATED ART

Timing models for sequential logic can be classified into two types: delay arcs and constraint arcs. Delay arcs capture the propagation time from input to output, while constraint arcs typically capture the relationship between sequential input and control signals (such as clock and enable), between asynchronous signals (such as clear, preset), or between control signals for correct operation of the logic. Sequential logic works by latching the logic state of input signals on memory nodes, which are controlled by control signals, and retaining that logic state when not driven by inputs. For the input to latch onto a memory node, the input has to settle to its final logic state before the control signal closes, thereby resulting in a setup time. For the memory node to hold onto the latched data, the input should not toggle close to the latching control signal transition, thereby resulting in a hold time between signals. To characterize this setup or hold time, a bisection search is used by switching the data input around the control signal closing edge and recording the minimum separation between data and control signal at which the memory node latches the data. Hence, correct identification of memory nodes is essential for sequential cell characterization.

In one technique, memory nodes can be provided as user inputs to the electronic design automation (EDA) tool. However, this technique undesirably requires a new memory node list for each new netlist. In another technique, the netlist can be topologically traversed to extract the memory nodes. This technique uses either pattern matching or heuristics to extract basic circuit structures, such as combinational gates, latches, etc., and then identify the memory nodes based on predetermined circuit structures. Unfortunately, using circuit structure identification does not scale well with new circuit families or topologies. In yet another technique, a circuit is partitioned into channel-connected blocks (CCBs) and then into strongly-connected components (SCCs). Specifically, CCBs that have a back-to-back connection are converted into SCCs. The output of a SCC is typically a memory node. However, for sequential logic with multiple clocks, or circuits with transmission gates, this static partitioning of the circuit into CCBs and SCCs fails to or incorrectly identifies memory nodes. For example, in the case of a simple master-slave flip-flop using transmission gates, construction of CCBs may span transistors from master and slave latches. To make sure CCBs comprise transistors from a single latch, buffers might be inserted between transmission gates. Therefore, this static partitioning must also include heuristics, which may lead to an increased potential for incorrect identification and also does not scale well with new circuit families or topologies.

Therefore, a need arises for a dynamic, scalable technique for memory node identification in sequential circuits.

SUMMARY

A method of identifying memory nodes in a design is described. For a sequential cell of the design, a plurality of simulations can be run using a plurality of vector sets to generate a plurality of node sets. In certain embodiments, these simulations can be preceded by at least one of reading a netlist, extracting constraint arcs between constraint and related pins, and generating an original vector set including initialization waveforms for each constraint arc. Each simulation generates a corresponding node set that toggles based on waveforms provided by a corresponding vector set. Each vector set is derived from the original vector set. A final set of memory nodes for the sequential circuit cell can be calculated by subtracting one node set from another node set. In one embodiment, the method can further include pruning non-gate connected nodes from the final node set.

In one embodiment, running the plurality of simulations can include running four simulations using four vector sets to generate first, second, third, and fourth node sets. In this case, calculating the final node set includes combining the first node set and the second node set to generate a first combined node set, combining the third node set and the fourth node set to generate a second combined node set, and subtracting the first combined node set from the second combined node set. In another embodiment, running the plurality of simulations can include running two simulations using two vector sets to generate first and second node sets. In this case, calculating the final node set includes subtracting the first node set from the second node set.

A non-transitory, computer-readable medium storing computer-executable instructions for identifying memory nodes in a design is also described. These instructions when executed by a computer cause the computer to execute a process comprising the above steps. An electronic design automation (EDA) tool including program instructions for identifying memory nodes in a design is also described. These program instructions perform a process comprising the above steps.

BRIEF DESCRIPTION OF THE DRAWINGS

FIGS. 4A and 4B illustrate an exemplary, detailed memory node identification technique.

DETAILED DESCRIPTION OF THE DRAWINGS

Characterizing sequential elements to generate accurate timing models requires the correct identification of memory nodes. The identification technique described herein assumes that a high-level description of the circuit functionality or constraint stimulus is available. This high-level description can be used to generate input vectors, which in turn can drive the simulation steps. Notably, this technique can identify internal nodes of the sequential circuit without requiring circuit topology traversal.

Figure 1:
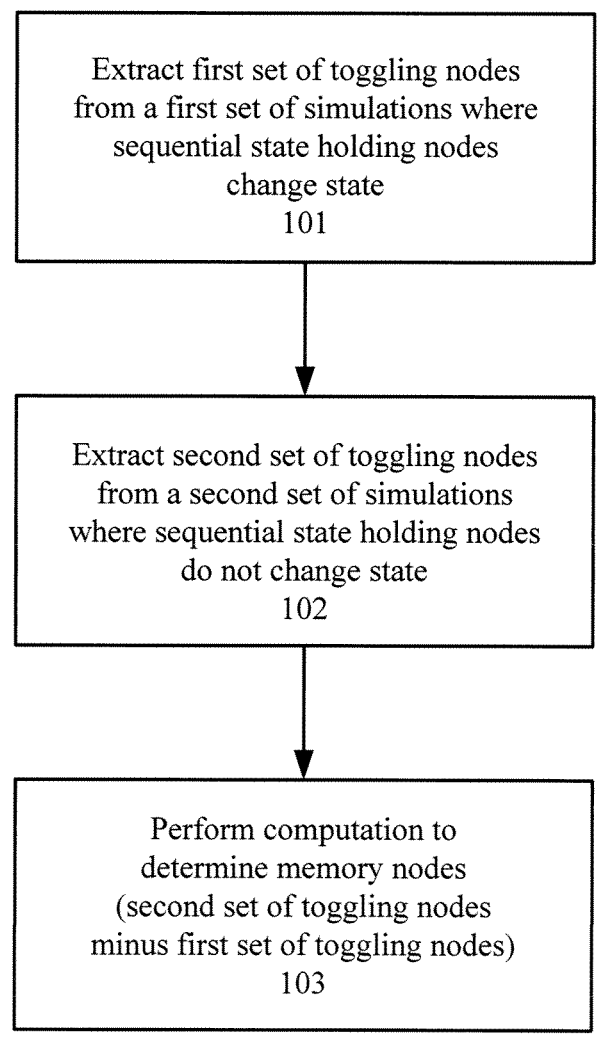
FIG. 1 illustrates an exemplary memory node identification technique.

FIG. 1 illustrates this internal node identification technique 100 for any netlist cell including one or more circuits having sequential state holding nodes (such as flip-flops, latches). In step 101, a first set of toggling nodes can be extracted from a first set of simulations where sequential state holding nodes change state. In step 102, a second set of toggling nodes can be extracted from a second set of simulations where sequential state holding nodes do not change state. In step 103, a computation can be performed to determine the memory nodes of the sequential cell. This computation includes subtracting the second set of toggling nodes from the first set of toggling nodes.

The identification of the sets of toggling nodes in steps 101 and 102 is described below in detail in reference to a master-slave flip-flop. However, note that this identification technique can be used with any combination of pins having a constraint arc in the sequential cell.

Figure 2:
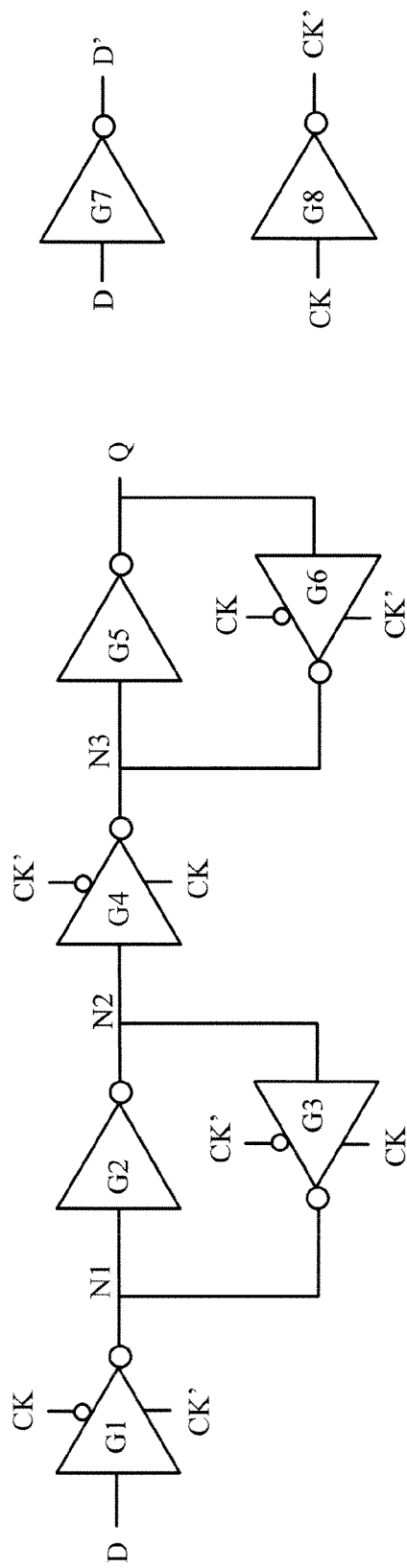
FIG. 2 illustrates an exemplary master-slave flip-flop including a plurality of logic gates.

FIG. 2 illustrates an exemplary master-slave flip-flop including six logic gates G1-G6, wherein logic gates G1, G3, G4, and G6 are clocked inverters and logic gates G2 and G5 are non-clocked inverters. In this embodiment, inverter G2 receives an input formed by combined outputs of inverters G1 and G3. Inverters G3 and G4 receive the output of inverter G2. Inverter G5 receives an input formed by combined outputs of inverters G4 and G6. Inverter G6 receives the output of inverter G5. Logic gates G7 and G8 indicate that D' is an inverted D, and CK' is an inverted CK, respectively. Both D' and CK' are internal to the master slave flip-flop.

Figure 3:
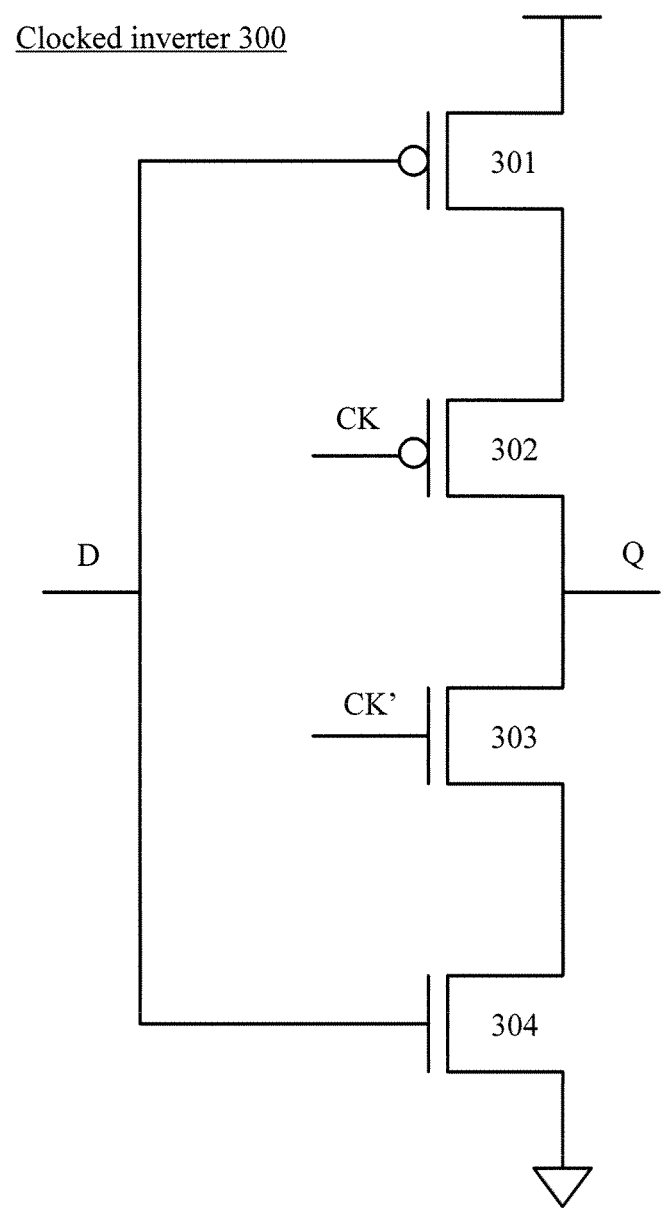
FIG. 3 illustrates an exemplary clocked inverter, which is well known in the art.

FIG. 3 illustrates an exemplary clocked inverter 300, which is well known in the art. Clocked inverter 300 includes four transistors 301-304 serially connected between a high voltage source (e.g. VDD) and a low voltage source (e.g. VSS). Transistors 301 and 302 are P-type transistors, whereas transistors 303 and 304 are N-type transistors. Transistors 301 and 304 receive a data D input, whereas transistors 302 and 303 receive a clock CK and CK' input. The output Q is provided by the drains of transistors 302 and 303. In this configuration, two legal states exist, i.e. when D=1 and CK=0, Q=0; and when D=0 and CK=0, Q=1. Note that the configuration of a non-clocked inverter would be similar to clocked inverter 300, except transistors 302 and 303 would be removed, the clock signal CK would not be used, and the drains of transistors 301 and 304 would be connected to provide the output Q.

In accordance with one feature of the improved node identification technique, constraint acquisition can be done through a bisection search. Specifically, a memory node to be monitored for a constraint will exhibit different behavior for the constraint pin switching before and after a related pin. For example, with respect to the master-slave flip-flop, a memory node will exhibit different behavior when the data pin switches before and after the clock pin. Different arcs may sensitize different memory nodes in the cell. Hence, as described below, memory node extraction can be repeated for multiple constraint arcs, thereby ensuring completeness.

The nodes within a sequential logic circuit can be classified into four types: non-memory nodes controlled only by constraint pins (node type one—NT1) (i.e. when the constraint pins toggle), non-memory nodes controlled only by related pins (node type two—NT2) (i.e. when the related pins toggle), memory nodes switching with constraint pins (node type three—NT3), memory nodes switching with related pins (node type four—NT4). By definition, a constraint pin obeys some relationship with respect to the related pin. That is, a signal to the constraint pin must come before or after a signal to the related pin in order for the circuit to properly function.

Note that both constraint and related pins are associated with primary inputs. Some designations of constraint and related pins can be determined based on which node is being constrained. For example, with set and reset pins, the designation of one pin to be the constraint pin can be determined by which node is being constrained. In one embodiment, when a logic zero output is desired, the reset pin can be characterized as the constraint pin (whereas the set pin can be characterized as the related pin). In contrast, when a logic one output is desired, the set pin can be characterized as the constraint pin (whereas the reset pin can be characterized as the related pin). In another embodiment, for logic zero, the reset pin can be characterized as the related pin (whereas the set pin can be characterized as the constraint pin. Therefore, when a logic one output is desired, the set pin can be characterized as the related pin (whereas the reset pin can be characterized as the constraint pin).

In a master-slave flip-flip, the data pin is characterized as a constraint pin, whereas the clock pin is characterized as a related pin (i.e. a signal must arrive on the data pin at least a predetermined time before a signal on the clock pin for proper operation). Thus, with respect to a master-slave flip-flop, NT1 would include non-memory nodes controlled only by the data pin, NT2 would include non-memory nodes controlled only by the clock pin, NT3 would include memory nodes switched by the data pin, and NT4 would include memory nodes switched by the clock pin.

Figure 4B:
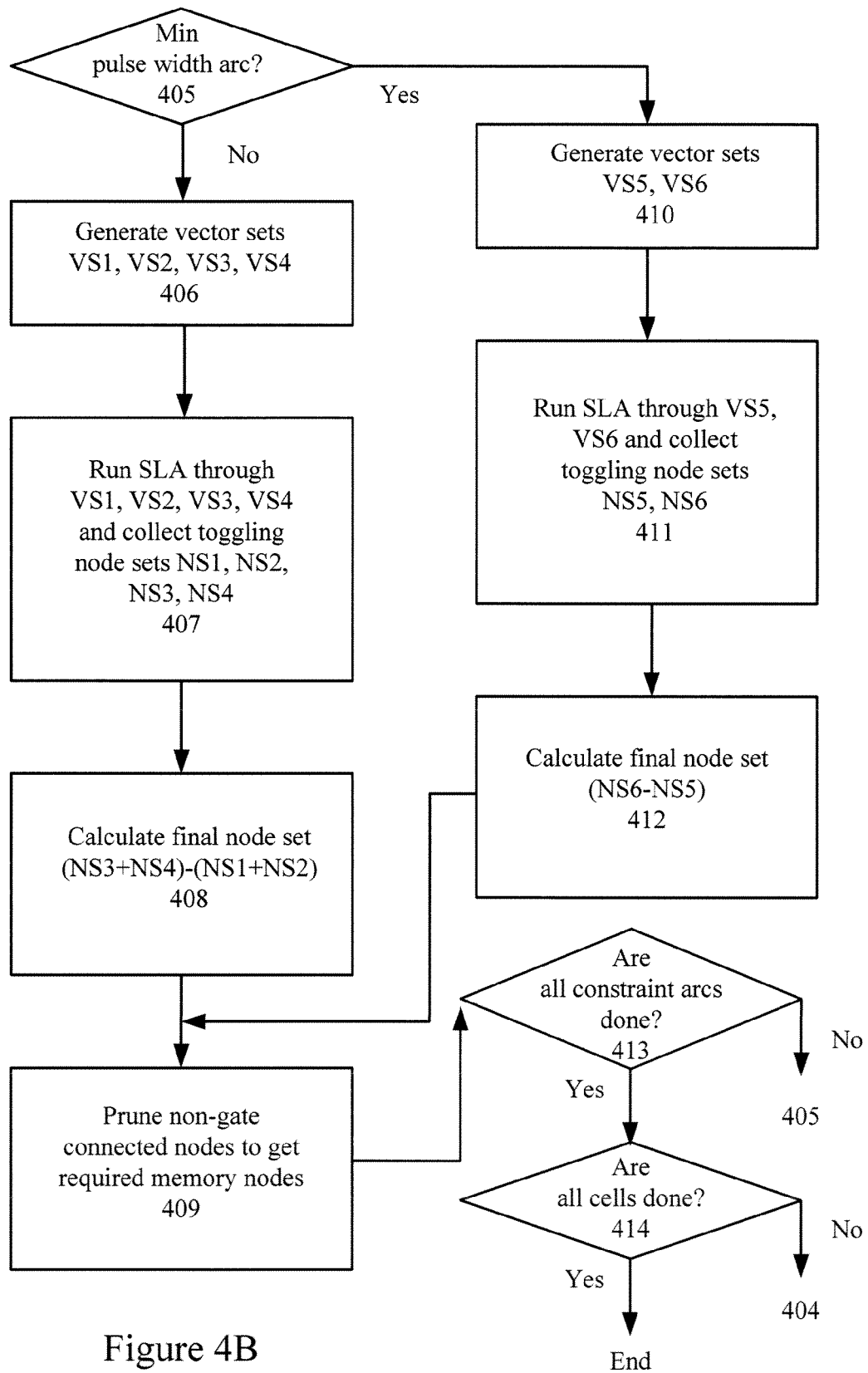

FIG. 4A illustrates a detailed memory node identification technique 400 that can determine node sets associated with the above-described node types. In one embodiment, vector sets VS1, VS2, VS3, and VS4 can be run during four simulations (one vector set per simulation) to generate node sets NS1, NS2, NS3, and NS4, respectively. In general, node set NS1 contains nodes of type NT1; node set NS2 contains nodes of type NT2; node set NS3 contains nodes of type NT3; and node set NS4 contains nodes of type NT4. As described below, each vector set can be tailored to determine control/switching by a constraint/related pin. Simulation to determine toggling nodes for each vector set can be done by any tool or technique. For simplicity, FIGS. 4A and 4B use switch-level analysis (SLA) to describe technique 400.

In step 401, the netlist for a design can be read. Based on this reading, an internal graph representation of each cell can be created in step 402 to perform switch level analysis (SLA). In step 403, for a sequential cell, constraint arcs between constraint and related pins can be extracted based on the reading. For each constraint arc, there is one constraint pin and one related pin. However, note that the same pin can act as a constraint pin for one constraint arc and as a related pin for another constraint arc.

In step 404, for each constraint arc in the sequential cell, an original vector set including a plurality of initialization waveforms, i.e. an original vector set, can be generated. In one embodiment, the input logic states provided by the original vector set can be propagated to as many internal nodes of the cell as can be reached. Nodes that cannot be reached can be set to an undefined state.

Figure 5A:
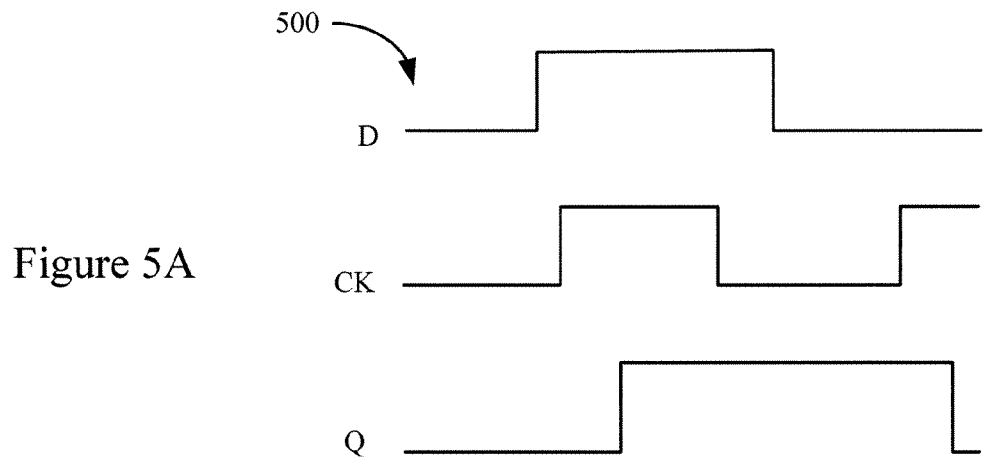
FIG. 5A illustrates an exemplary original vector set.

FIG. 5A illustrates an exemplary original vector set 500 including waveforms for data (D), clock (CK), and output (Q) for a master-slave flip-flop (see, e.g. FIG. 2). In general, for an edge-triggered D-type master-slave flip-flop, D must transition (high to low (10), or low to high (01)) a predetermined time before CK transitions (low to high (01)) to ensure that Q transitions/toggles.

Figure 5B:
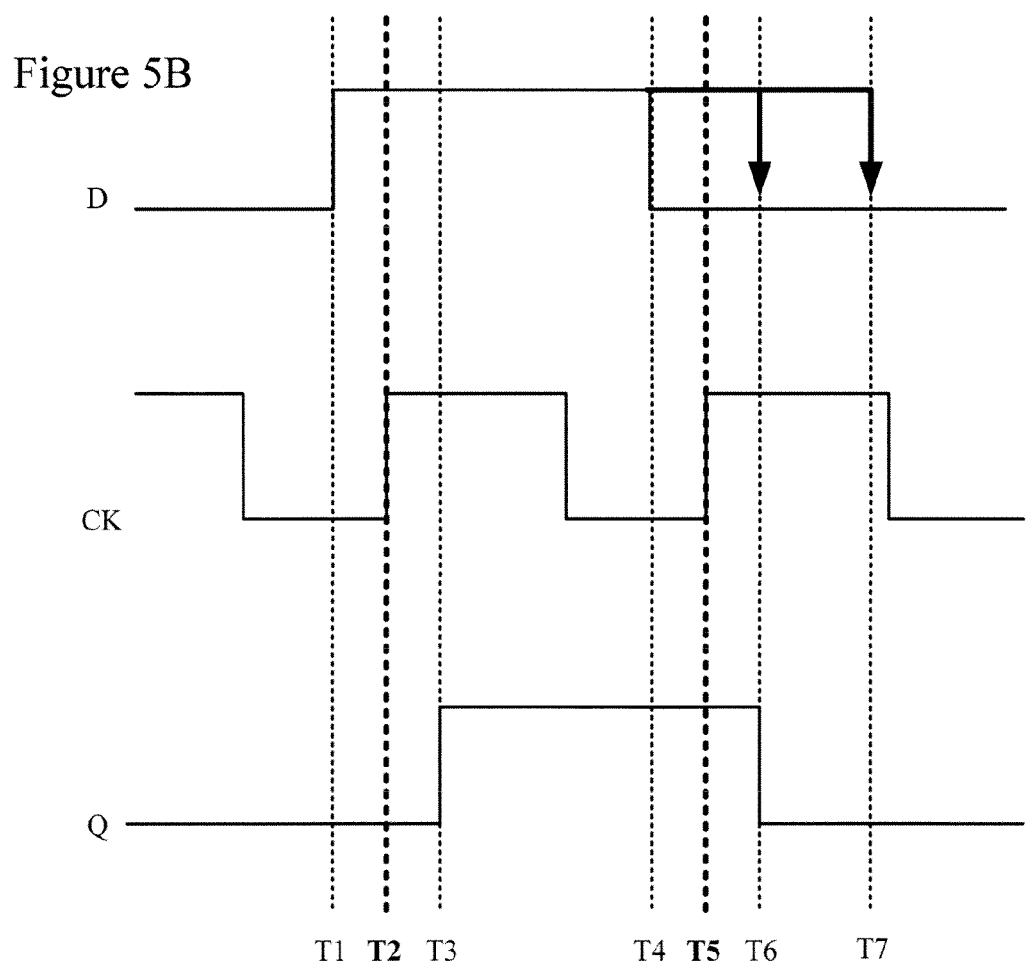
FIG. 5B illustrates an exemplary technique for determining a set-up time.

In FIG. 5B, D transitions (01) at time T1, CK transitions (01) at time T2, and Q transitions at time T3 (01). Since, CK edge at T2 sets Q to logic one, which is the initial state for a falling transition, the CK edge at T2 is called initialization edge. D also transitions (10) at time T4, CK transitions at time T5, and Q transitions at time T6. To determine the setup time, i.e. the minimum time for D to transition before the transition of CK to ensure a transition of Q, a bisection search technique can be used.

In this bisection technique, time T4 can be characterized as a lower bound because the window between times T4 and T5 resulted in a toggle of Q at time T6. In one embodiment, a longer time period can be used for the transition of D, e.g. time T7. In this case, Q will not toggle because D transitions after CK. Therefore, time T7 can be characterized as an upper bound. At this point, the window between times T4 and T7 can be bisected, which results in time T6. For time T6, D still transitions after CK, therefore Q does not toggle. Successive bisections can be performed until the window results in a successful toggle of Q (in FIG. 5B, sometime between T4 and T5). In one embodiment, a new upper bound can be designated at the last unsuccessful bisection edge with subsequent bisections being performed for a more finely-tuned window. In one embodiment, the user can designate a specific time tolerance for the setup window (e.g. within N milliseconds, wherein N is any integer or fraction) to ensure an end to the bisection technique.

Referring to FIG. 4B, a determination can be made whether the constraint arc is a minimum pulse width arc. Note that determining the arc type, i.e. a setup/hold or a minimum pulse width arc is done during arc creation (e.g. during step 403, FIG. 4A). A setup/hold arc specifies the constraint relationship between two input pins for correct behavior of the circuit. A minimum pulse width arc specifies the minimum active duration of a control signal, such as a clock or asynchronous pins for asserting required output change. After the arcs are created, they are labeled as to what type they are.

When a minimum pulse width arc is not involved, the vector sets VS1, VS2, VS3, and VS4 can be generated in step 406, each vector set including the same type waveforms as the original vector set (for the master-slave flip-flop, D, CK, and Q). Two of these vector sets modify at least one waveform of the original vector set to provide the conditions appropriate to determine the node set of the cell that toggles under those conditions. The remaining two of these vector sets focus on specific transitions of the original vector set that provide the conditions appropriate to determine the node set of the cell that toggles during those transitions. Vectors sets VS1, VS2, VS3, and VS4 are described in detail below. In step 407, simulations can be performed using VS1, VS2, VS3, and VS4 to collect the toggling nodes sets NS1, NS2, NS3, and NS4, respectively. In one embodiment, these simulations can be performed using a switch level analyzer (SLA).

Figure 6A:
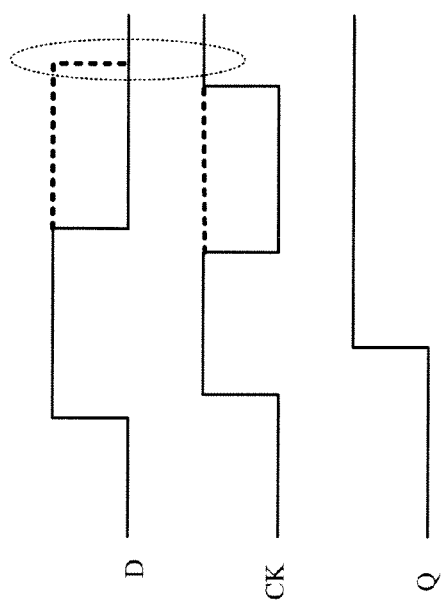
FIG. 6A illustrates the waveforms used for a first vector set (VS1), which can extract nodes controlled by a constraint pin.
Figure 6B:
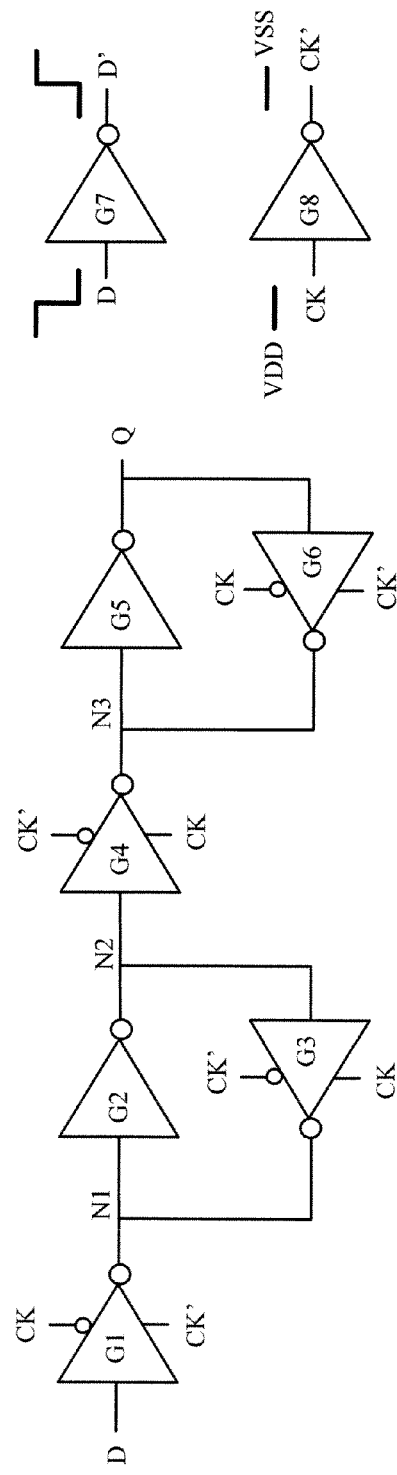
FIG. 6B illustrates the waveforms of VS1 applied to the circuit of a cell.

Vector set VS1, as indicated above for NT1, can be used to identify non-memory nodes controlled only by constraint pins. In effect, VS1 can extract combinational connections to D. FIG. 6A illustrates the waveforms used for VS1. In one embodiment, Q is initialized to logic one. As shown, the waveforms associated with D and CK are modified (indicated by dotted lines) to ensure that VS1 simulates D falling without CK rising. FIG. 6B illustrates the master-slave flip-flop with the VS1 applied to the circuit of the cell. When VS1 is applied to the master-slave flip-flop, only D and D' toggle. That is, because G1 is a clocked inverter and CK is set to a logic one, G1 (see FIG. 3) is effectively disabled, thereby ensuring that no other nodes in the master-slave flip-flop toggle. Therefore, NS1=D, D'.

Figure 7A:
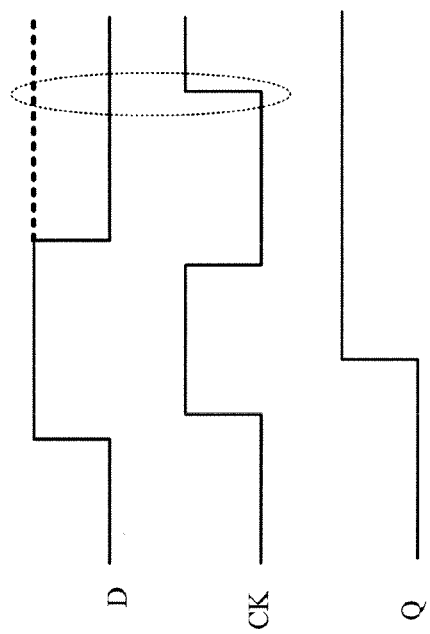
FIG. 7A illustrates the waveforms used for a second vector set (VS2), which can extract nodes controlled by a related pin.
Figure 7B:
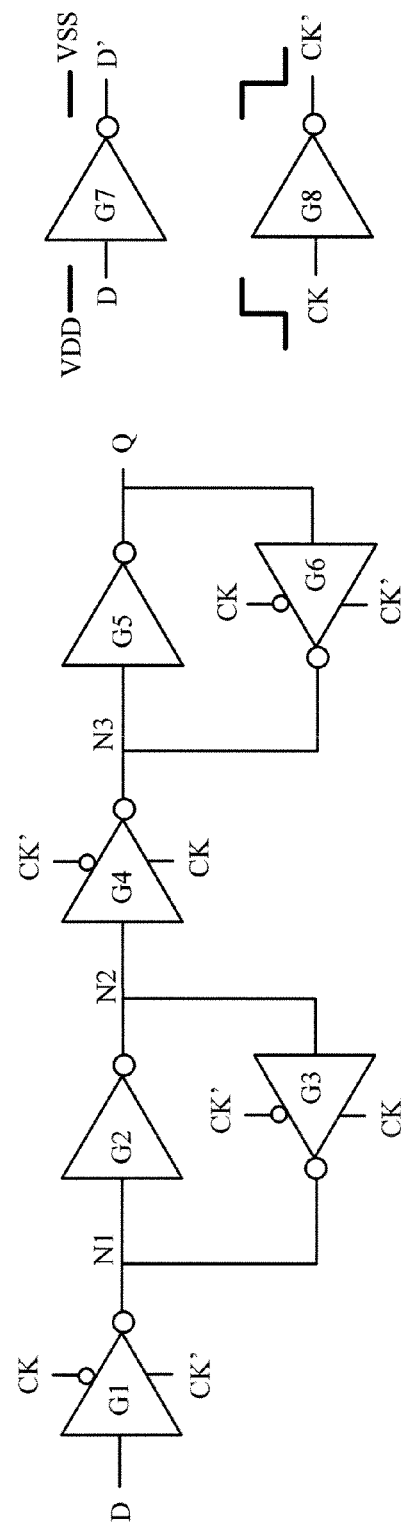
FIG. 7B illustrates the waveforms of VS2 applied to the circuit of the cell.

Vector set VS2, as indicated above for NT2, can be used to identify non-memory nodes controlled only by related pins. In effect, VS2 can extract combinational connections to CK. FIG. 7A illustrates the waveforms used for VS2. Once again, Q can be initialized to logic one (i.e. the same initialization for VS1). As shown, the waveform associated with D is modified (indicated by dotted line) to ensure that VS2 simulates CK rising with D high. FIG. 7B illustrates the master-slave flip-flop with the VS2 applied to circuit of the cell. When VS2 is applied to the master-slave flip-flop, only CK and K' toggle. Note that nodes N1, N2, and N3 transition to their final logic state at the first CK rising edge (i.e. the initialization edge), and therefore the second CK rising edge does not result in any toggling of those nodes. Therefore, NS2=CK, CK'.

Figure 8A:
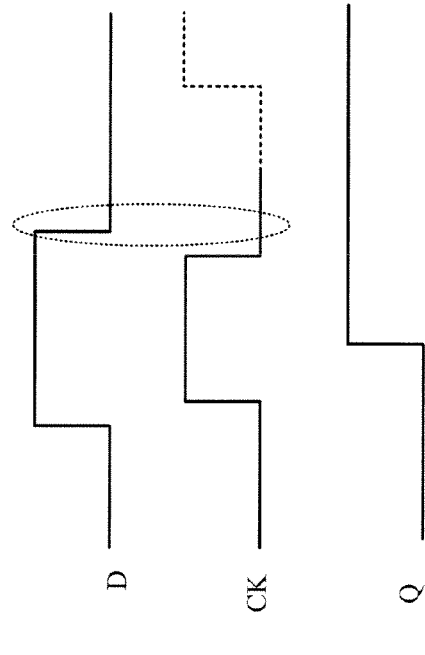
FIG. 8A illustrates the waveforms used for a third vector set (VS3), which can ensure that a constraint pin toggles with the related pin set to an initial state.
Figure 8B:
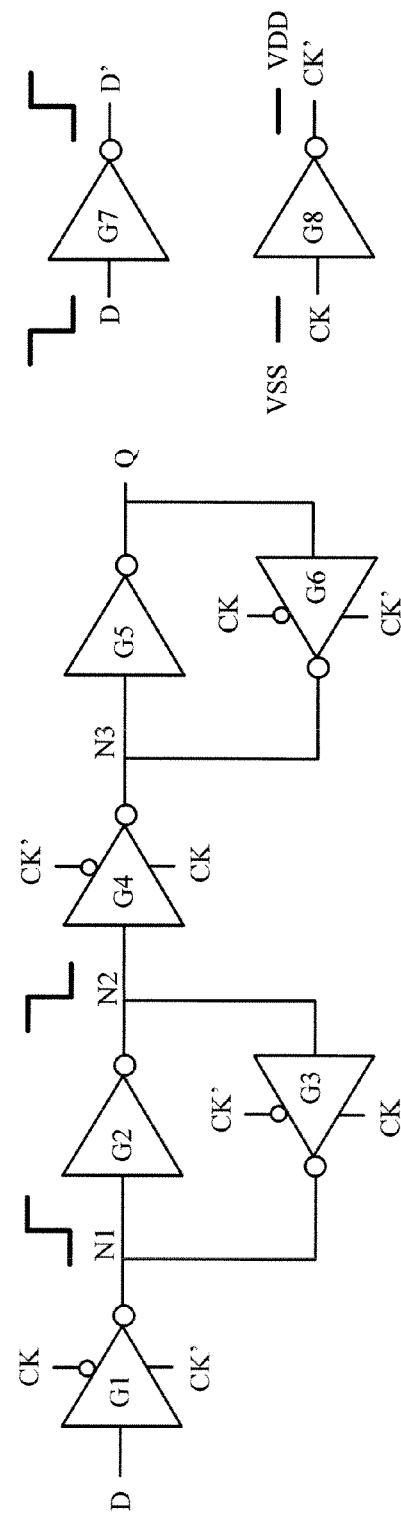
FIG. 8B illustrates the waveforms of VS3 applied to the circuit of the cell.

Vector set VS3, as indicated above for NT3, can be used to identify memory nodes switching with constraint pins. FIG. 8A illustrates the waveforms used for VS3. Once again, Q can be initialized to logic one (i.e. the same initialization for VS1 and VS2). As shown, the waveforms associated with D and CK do not need to be modified and, as is, ensure that VS3 simulates D is falling when CK is low (and simulation is stopped before the second CK rising edge). FIG. 8B illustrates the master-slave flip-flop with the VS3 applied to circuit of the cell. When VS3 is applied to the master-slave flip-flop, D, D', N1, and N2 toggle. Note that logic gate G4, unlike logic gate G2, is not enabled, as CK is set to logic zero. Hence, further propagation of signals beyond G4 does not happen. Therefore, NS3=D, D', N1, and N2.

Figure 9A:
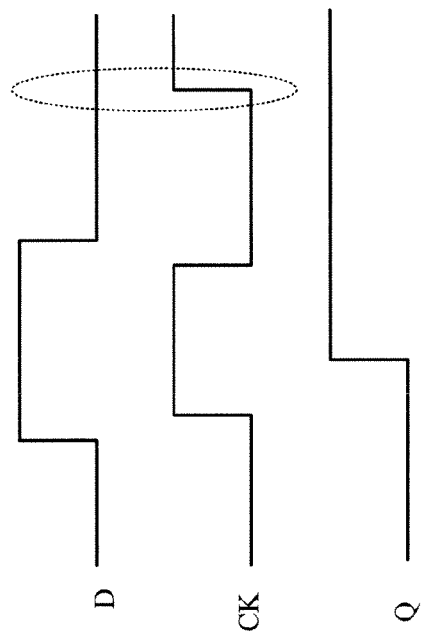
FIG. 9A illustrates the waveforms used for a fourth vector set (VS4), which can ensure that a related pin toggles with the constraint pin set to a final state.
Figure 9B:
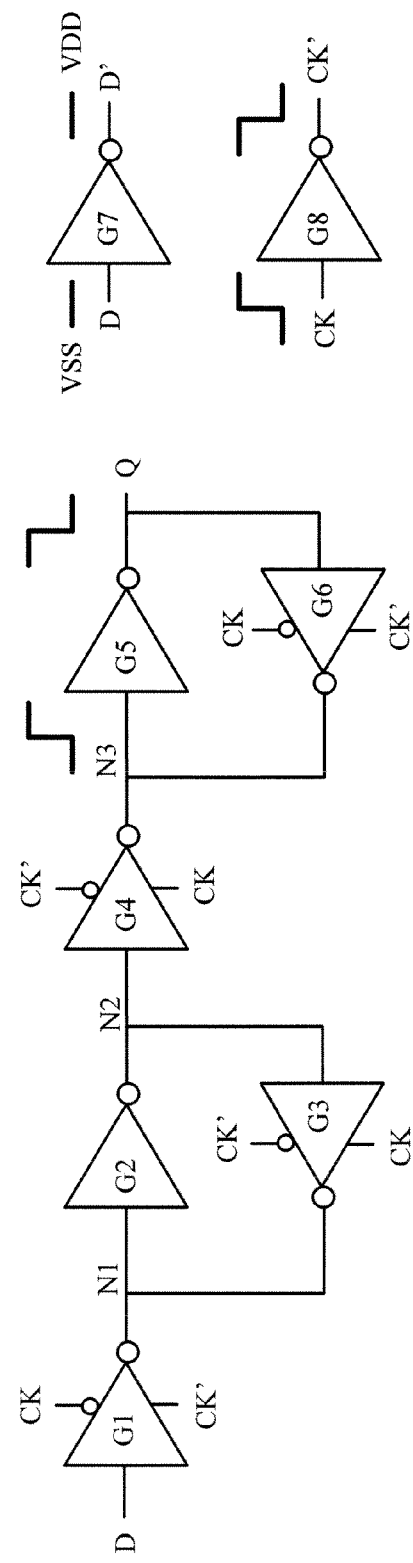
FIG. 9B illustrates the waveforms of VS4 applied to the circuit of the cell.

Vector set VS4, as indicated above for NT4, can be used to identify memory nodes switching with related pins. FIG. 9A illustrates the waveforms used for VS4. Once again, Q can be initialized to logic one (i.e. the same initialization for VS1, VS2, and VS3). As shown, the waveforms associated with D and CK do not need to be modified and, as is, ensure that VS4 simulates CK rising when D is low. FIG. 9B illustrates the master-slave flip-flop with the VS4 applied to circuit of the cell. When VS4 is applied to the master-slave flip-flop, CK, CK', N3, and Q toggle. Therefore, NS3=CK, CK', N3, and Q.

After the simulations running VS1, VS2, VS3, and VS4, some post-processing is needed. Note that NS3 and NS4 represent the memory nodes controlled by the data and clock pins, whereas NS1 and NS2 contain the combinational nodes controlled only by the data and clock pins, respectively. Thus, NS3 and NS4 (NS3+NS4) are a superset of NS1 and NS2 (NS1+NS2) because combinational nodes controlled by the data and clock pins also transition along with memory nodes when VS3 and VS4 are applied to the circuit. Therefore, referring back to FIG. 4B, in step 408, the final node set can be calculated as (NS3+NS4)−(NS1+NS2). As a result, in the above-described master-slave flip-flop, the final node set=N1, N2, N3, and Q. The final node set includes the internal memory nodes of the cell (in this case, the master-slave flip-flop).

Note that during simulations of the circuit with the four vector sets, certain nodes, such as stacked source/drain nodes, could transition. Because these nodes are not potential memory nodes, they can be pruned in step 409 from the final node set.

When not all constraint arcs of the cell have been analyzed, as determined in step 413, then memory node identification technique 400 returns to step 405 for analysis of the new constraint arc. When all constraint arcs of the cell have been analyzed, then a determination is made in step 414 whether all sequential cells have been analyzed. If not, then technique 400 returns to step 404; if so, then technique 400 ends.

When a waveform of the original vector set is a minimum pulse width arc, as determined in step 405, then in step 410 only two vector sets VS5 and VS6 need to be generated because the constraint and the related pins are the same. Once again, each vector set includes the same type waveforms as the original vector set (for the master-slave flip-flop: D, CK, and Q). In step 411, simulations can be performed using VS5 and VS6 to collect the toggling nodes sets NS5 and NS6, respectively. In one embodiment, these simulations can be performed using a switch level analyzer (SLA).

Figure 10A:
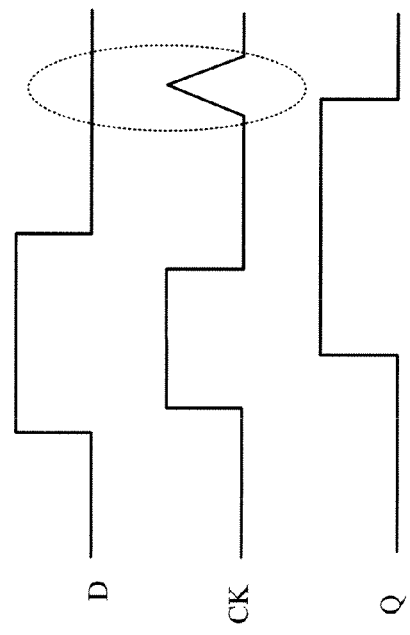
FIG. 10A illustrates the original waveforms used for minimum pulse width extraction.
Figure 10B:
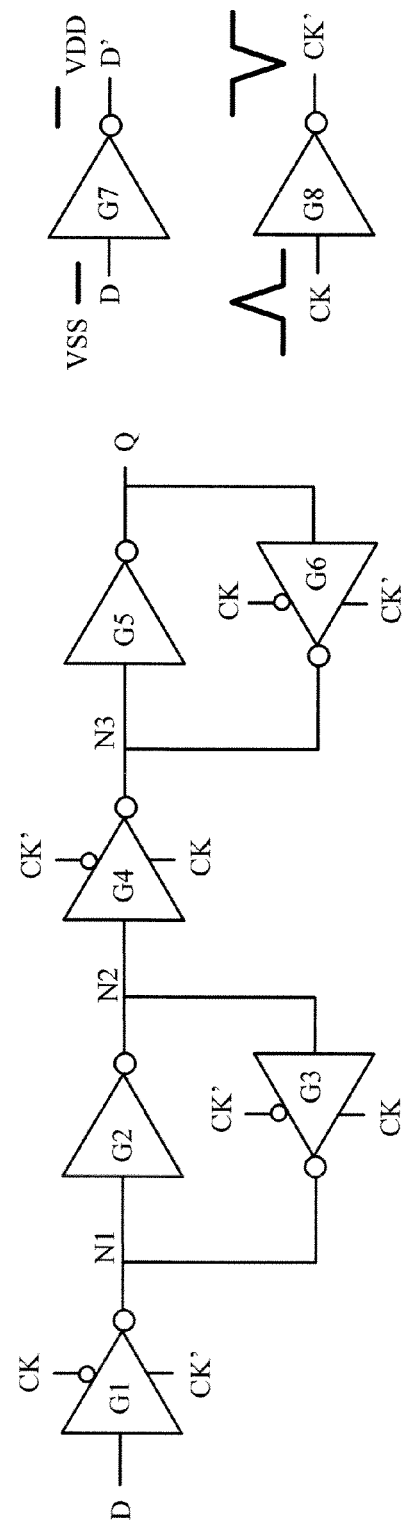
FIG. 10B illustrates the original waveforms applied to the circuit of the cell.

FIG. 10A illustrates the original waveforms used for MPW extraction. As shown, Q is initialized to logic one and D is falling. Moreover, the waveform associated with CK is a triangular pulse, which with sufficient width can ensure that Q transitions from logic one to logic zero. FIG. 10B illustrates the master-slave flip-flop with the original waveforms applied to circuit of the cell.

Figure 11A:
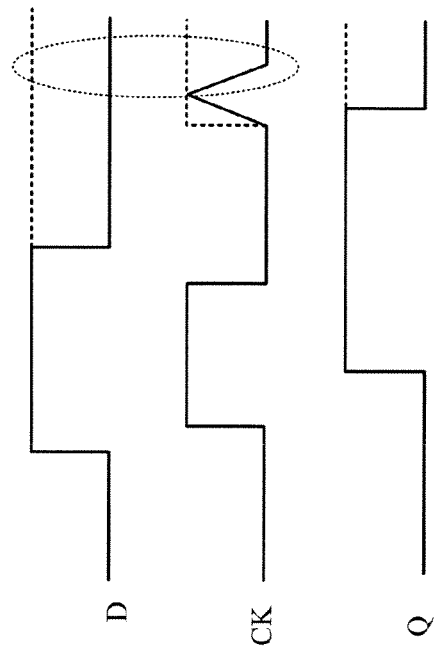
FIG. 11A illustrates the waveforms used for a fifth vector set (VS5), which can extract combinational connections to the clock signal.
Figure 11B:
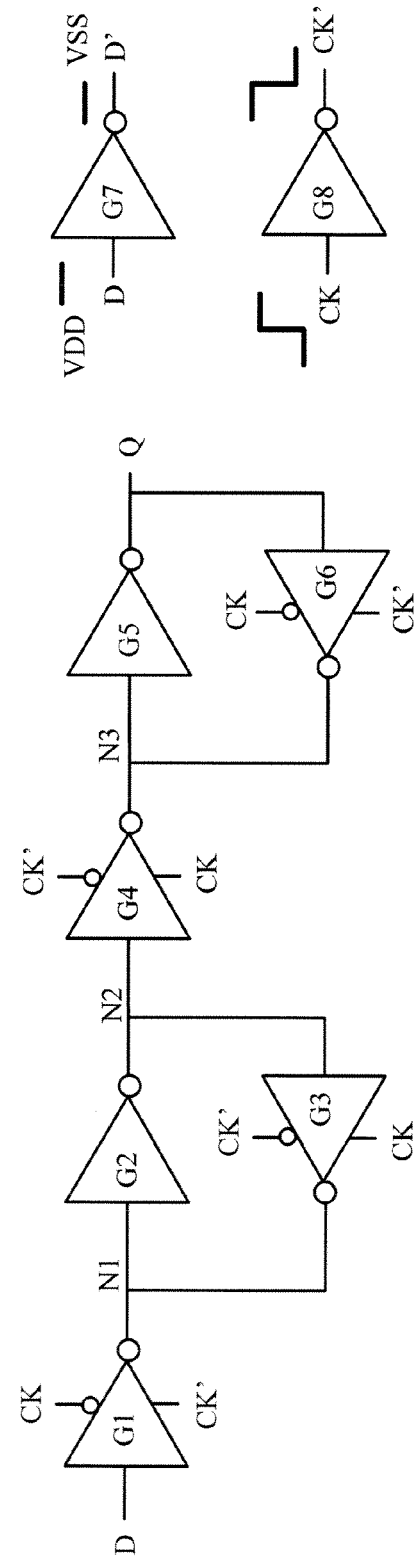
FIG. 11B illustrates the waveforms of VS5 applied to the circuit of the cell.

Vector set VS5 can be used to extract combinational connections to CK. FIG. 11A illustrates the modifications to the original waveforms (FIG. 10A) used for VS5. Once again, Q is initialized to logic one, but D remain high. As shown, the waveform associated with CK is modified to have a rising edge (instead of the triangular pulse). FIG. 11B illustrates the master-slave flip-flop with VS5 applied to circuit of the cell. When VS5 is applied to the master-slave flip-flop, only CK and CK' toggle. Therefore, NS5=CK, CK'.

Figure 12A:
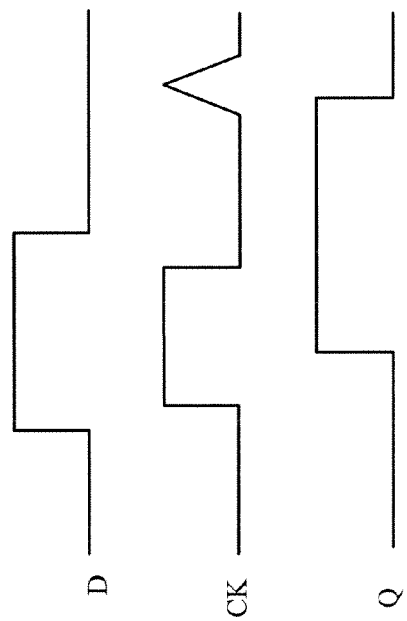
FIG. 12A illustrates the waveforms used for a sixth vector set (VS6), which can extract memory nodes controlled by the clock signal.
Figure 12B:
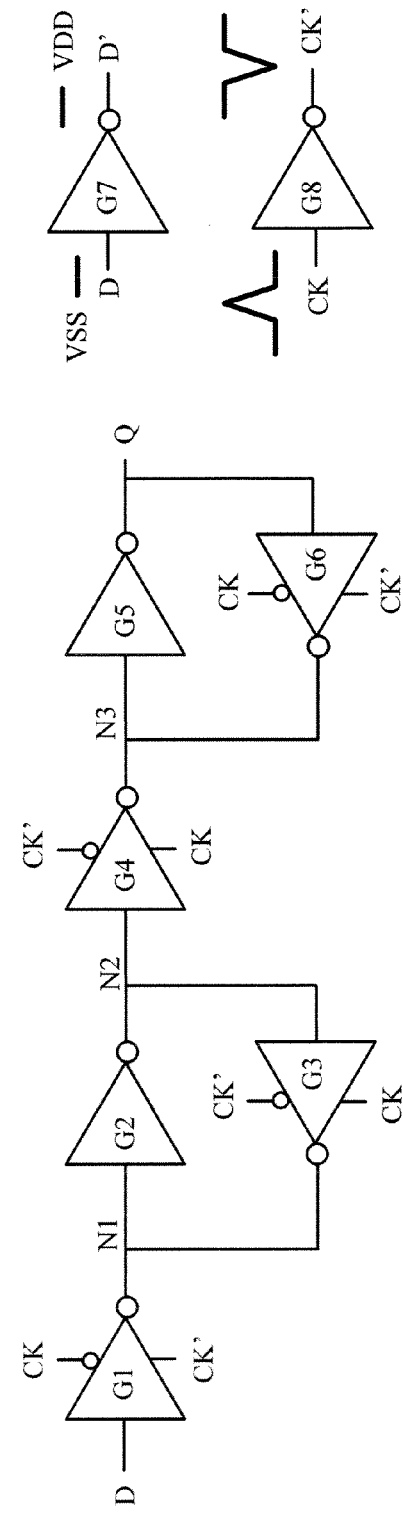
FIG. 12B illustrates the waveforms of VS6 applied to the circuit of the cell.

Vector set VS6 can be used to extract memory nodes controlled by CK. FIG. 12A illustrates that no modifications are made to the original waveforms (FIG. 10A) used for VS6. Once again, Q is initialized to logic one, D is falling, and the waveform associated with CK is a triangular pulse. FIG. 12B illustrates the master-slave flip-flop with VS6 applied to circuit of the cell. When VS6 is applied to the master-slave flip-flop, N3, Q, CK, and CK' toggle. Note that N1 and N2 are at logic low using the waveforms of FIG. 11A and therefore do not transition. Therefore, NS6=N3, Q, CK, CK'.

Referring back to FIG. 4B, the final node set can be calculated in step 412 as NS6-NS5 (e.g. in the example above, the final node set includes N3 and Q). After calculation, non-gate connected nodes can be pruned in step 409, as previously described.

As described above, the memory node identification techniques for sequential cells (100, 400) can determine the memory nodes using a limited number of simulations. Note that techniques 100, 400 include steps described in different terms, but providing substantially the same result. That is, step 101 can be characterized as generating and running simulations using vector sets VS3 and VS4, whereas step 102 can be characterized as generating and running simulations using vector sets VS1 and VS2. Notably, both memory node identification techniques do not need to traverse the netlist to extract the functional blocks. Therefore, no library of sequential cell topologies is required for pattern matching. As a result, the memory node identification techniques described above are advantageously scalable to new designs and topologies.

Figure 13:
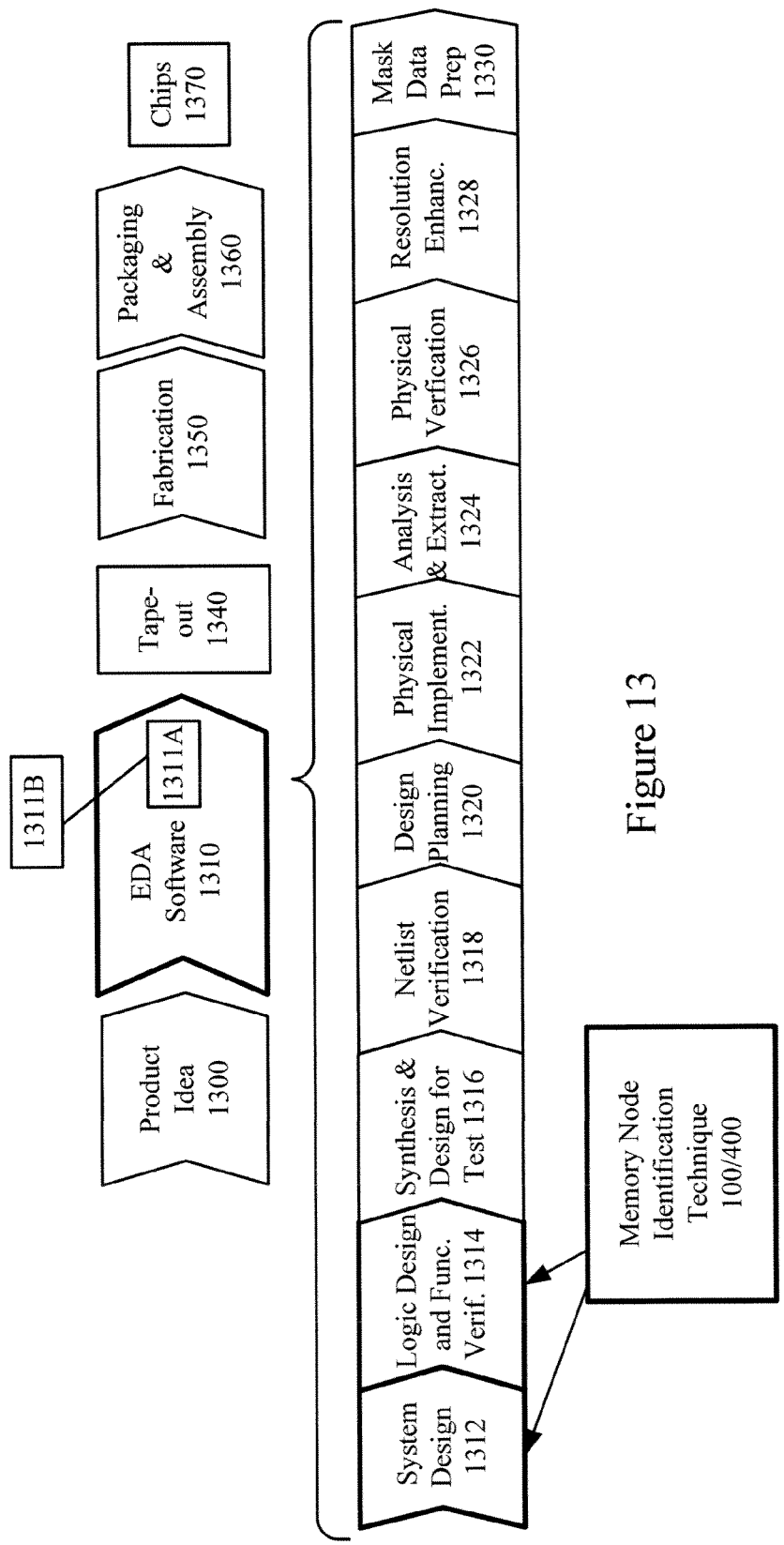
FIG. 13 shows a simplified representation of an exemplary digital ASIC design flow including a memory node identification technique.

FIG. 13 shows a simplified representation of an exemplary digital ASIC design flow including a memory node identification technique. At a high level, the process starts with the product idea (step 1300) and is realized in an EDA software design process (step 1310). When the design is finalized, it can be taped-out (event 1340). After tape out, the fabrication process (step 1350) and packaging and assembly processes (step 1360) occur resulting, ultimately, in finished chips (result 1370).

The EDA software design process (step 1310) is actually composed of a number of steps 1312-1330, shown in linear fashion for simplicity. In an actual ASIC design process, the particular design might have to go back through steps until certain tests are passed. Similarly, in any actual design process, these steps may occur in different orders and combinations. This description is therefore provided by way of context and general explanation rather than as a specific, or recommended, design flow for a particular ASIC.

A brief description of the components/steps of the EDA software design process (step 1310) will now be provided. In one embodiment, one or more steps of the EDA software design process can be implemented using a computer-readable medium 1311A, which is read by a computer 1311B. Note that Astro, AstroRail, CustomSim, ESP, Hercules, IC Compiler, Magellan, Model Architect, Power Compiler, PrimeRail, Proteus, ProteusAF, PSMGen, Saber, StarRC, and System Studio are trademarks of Synopsys, Inc., and CATS, DesignWare, Design Compiler, Formality, HSIM, Leda, NanoSim, Primetime, Syndicated, TetraMAX, VCS, and Vera are registered trademarks of Synopsys, Inc.

System design (step 1312): The designers describe the functionality that they want to implement, they can perform what-if planning to refine functionality, check costs, etc. Hardware-software architecture partitioning can occur at this stage. Exemplary EDA software products from Synopsys, Inc. that can be used at this step include Model Architect™, Saber™, System Studio™, and DesignWare® products. In one embodiment, the above-described memory node identification technique 100/400 can be performed in step 1312.

Logic design and functional verification (step 1314): At this stage, the VHDL or Verilog code for modules in the system is written and the design is checked for functional accuracy. More specifically, the design is checked to ensure it generates expected outputs. Exemplary EDA software products from Synopsys, Inc. that can be used at this step include HSIM®, NanoSim®, CustomSim™, VCS®, VERA®, DesignWare®, Magellan™, Formality®, ESP™ and LEDA® products. Note that memory node identification technique 100/400 can form part of the characterization of the standard cell libraries used by the EDA tool. This characterization can occur any time after the circuits of the standard cells are available, but should be complete at least by step 1316. Therefore, technique 100/400 can be characterized as independent of steps 1312 and 1314.

Synthesis and design for test (step 1316): Here, the VHDL/Verilog is translated to a netlist. The netlist can be optimized for the target technology. Additionally, the design and implementation of tests to permit checking of the finished chip occurs. Exemplary EDA software products from Synopsys, Inc. that can be used at this step include Design Compiler®, Power Compiler™, Tetramax®, and DesignWare® products.

Netlist verification (step 1318): At this step, the netlist is checked for compliance with timing constraints and for correspondence with the VHDL/Verilog source code. Exemplary EDA software products from Synopsys, Inc. that can be used at this step include Formality®, PrimeTime™, and VCS® products.

Design planning (step 1320): Here, an overall floorplan for the chip is constructed and analyzed for timing and top-level routing. Exemplary EDA software products from Synopsys, Inc. that can be used at this step include Astro™ and IC Compiler™ products.

Physical implementation (step 1322): The placement (positioning of circuit elements) and routing (connection of the same) occurs at this step. Exemplary EDA software products from Synopsys, Inc. that can be used at this step include the Astro™ and IC Compiler™ products.

Analysis and extraction (step 1324): At this step, the circuit function is verified at a transistor level, this in turn permits what-if refinement. Exemplary EDA software products from Synopsys, Inc. that can be used at this step include AstroRail™, PrimeRail™, Primetime®, and Star RC/XT™ products.

Physical verification (step 1326): At this step various checking functions are performed to ensure correctness for: manufacturing, electrical issues, lithographic issues, and circuitry. Exemplary EDA software products from Synopsys, Inc. that can be used at this step include the Hercules™ product.

Resolution enhancement (step 1328): This step involves geometric manipulations of the layout to improve manufacturability of the design. Exemplary EDA software products from Synopsys, Inc. that can be used at this step include Proteus™, ProteusAF™, and PSMGen™ products.

Mask data preparation (step 1330): This step provides the "tape-out" data for production of masks for lithographic use to produce finished chips. Exemplary EDA software products from Synopsys, Inc. that can be used at this step include the CATS® family of products.

The memory node identification techniques can be implemented advantageously in one or more computer programs that execute on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors, as well as other types of micro-controllers. Generally, a processor will receive instructions and data from a read-only memory and/or a random access memory. Generally, a computer will include one or more mass storage devices for storing data files; such devices include magnetic disks, such as internal hard disks and removable disks, magneto-optical disks, and optical disks. Storage devices suitable for tangibly embodying computer program instructions and data include all forms of non-volatile memory, including by way of example semiconductor memory devices, such as EPROM, EEPROM, and flash memory devices, magnetic disks such as internal hard disks and removable disks, magneto-optical disks, and CDROM disks. Any of the foregoing can be supplemented by, or incorporated in, application-specific integrated circuits (ASICs).

Although illustrative embodiments of the invention have been described in detail herein with reference to the accompanying figures, it is to be understood that the invention is not limited to those precise embodiment. They are not intended to be exhaustive or to limit the invention to the precise forms disclosed. As such, many modifications and variations will be apparent to practitioners skilled in this art. Accordingly, it is intended that the scope of the invention be defined by the following claims and their equivalents.

The invention claimed is:

1. A method of identifying memory nodes in a design such that said identified memory nodes can be subsequently utilized to verify and finalize the design prior to fabricating an integrated circuit using the finalized design, the method comprising:
for a sequential cell of the design, extracting constraint arcs between constraint and related pins;
for each constraint arc,
generating an original vector set including initialization waveforms;
using a computer, running a plurality of simulations using a plurality of vector sets to generate a plurality of node sets, each simulation generating a corresponding node set that toggles based on waveforms provided by a corresponding vector set, each vector set derived from the original vector set; and
calculating a final node set of memory nodes for the sequential cell by subtracting one node set from another node set, such that the design is subsequently verified and finalized based on at least the final node set of the memory nodes
wherein said running the plurality of simulations includes running four simulations using four vector sets to generate first, second, third, and fourth node sets, and
wherein said calculating the final node set includes:
combining the first node set and the second node set to generate a first combined node set;
combining the third node set and the fourth node set to generate a second combined node set; and
subtracting the first combined node set from the second combined node set.

2. The method of claim 1, further including pruning non-gate connected nodes from the final node set.

3. A non-transitory, computer-readable medium storing computer-executable instructions for identifying memory nodes in a design such that said identified memory nodes can be subsequently utilized to verify and finalize the design prior to fabricating an integrated circuit using the finalized design, the instructions when executed by a computer cause the computer to execute a process comprising:
for a sequential cell of the design, extracting constraint arcs between constraint and related pins;
for each constraint arc,
generating an original vector set including initialization waveforms;

running a plurality of simulations using a plurality of vector sets to generate a plurality of node sets, each simulation generating a corresponding node set that toggles based on waveforms provided by a corresponding vector set, each vector set derived from the original vector set; and calculating a final node set of memory nodes for the sequential circuit cell by subtracting one node set from another node set, such that the design is subsequently verified and finalized based on at least the final node set of the memory nodes, wherein said running the plurality of simulations includes running four simulations using four vector sets to generate first, second, third, and fourth node sets, and wherein said calculating the final node set includes:
combining the first node set and the second node set to generate a first combined node set;
combining the third node set and the fourth node set to generate a second combined node set; and
subtracting the first combined node set from the second combined node set.

4. The non-transitory, computer-readable medium of claim 3, further including pruning non-gate connected nodes from the final node set.

5. A computer comprising an electronic design automation (EDA) tool including program instructions for identifying memory nodes in a design such that said identified memory nodes can be subsequently utilized to verify and finalize the design prior to fabricating an integrated circuit using the finalized design, said program instructions performing a process comprising:

for a sequential cell of the design, extracting arcs between constraint and related pins;

for each constraint arc,
generating an original vector set including initialization waveforms;
running a plurality of simulations using a plurality of vector sets to generate a plurality of node sets, each simulation generating a corresponding node set that toggles based on waveforms provided by a corresponding vector set, each vector set derived from the original vector set; and
calculating a final node set of memory nodes for the sequential circuit cell by subtracting one node set from another node set, such that the design is subsequently verified and finalized based on at least the final node set of the memory nodes, wherein said running the plurality of simulations includes running four simulations using four vector sets to generate first, second, third, and fourth node sets, and wherein said calculating the final node set includes:
combining the first node set and the second node set to generate a first combined node set;
combining the third node set and the fourth node set to generate a second combined node set; and
subtracting the first combined node set from the second combined node set.

6. The computer comprising the EDA tool of claim 5, further including pruning non-gate connected nodes from the final node set.

7. A method of identifying memory nodes in a design such that said identified memory nodes can be subsequently utilized to verify and finalize the design prior to fabricating an integrated circuit using the finalized design, the method comprising:

receiving an original vector set including initialization waveforms;

using a computer, for a sequential cell of the design, running a plurality of simulations using a plurality of vector sets to generate a plurality of node sets, each simulation generating a corresponding node set that toggles based on waveforms provided by a corresponding vector set, each vector set derived from the original vector set; and calculating a final node set of memory nodes for the sequential cell by subtracting one node set from another node set, such that the design is subsequently verified and finalized based on at least the final node set of the memory nodes, wherein said running the plurality of simulations includes running four simulations using four vector sets to generate first, second, third, and fourth node sets, and wherein said calculating the final node set includes:
combining the first node set and the second node set to generate a first combined node set;
combining the third node set and the fourth node set to generate a second combined node set; and
subtracting the first combined node set from the second combined node set.

8. The method of claim 7, further including pruning non-gate connected nodes from the final node set.

* * * * *